Figure 1:
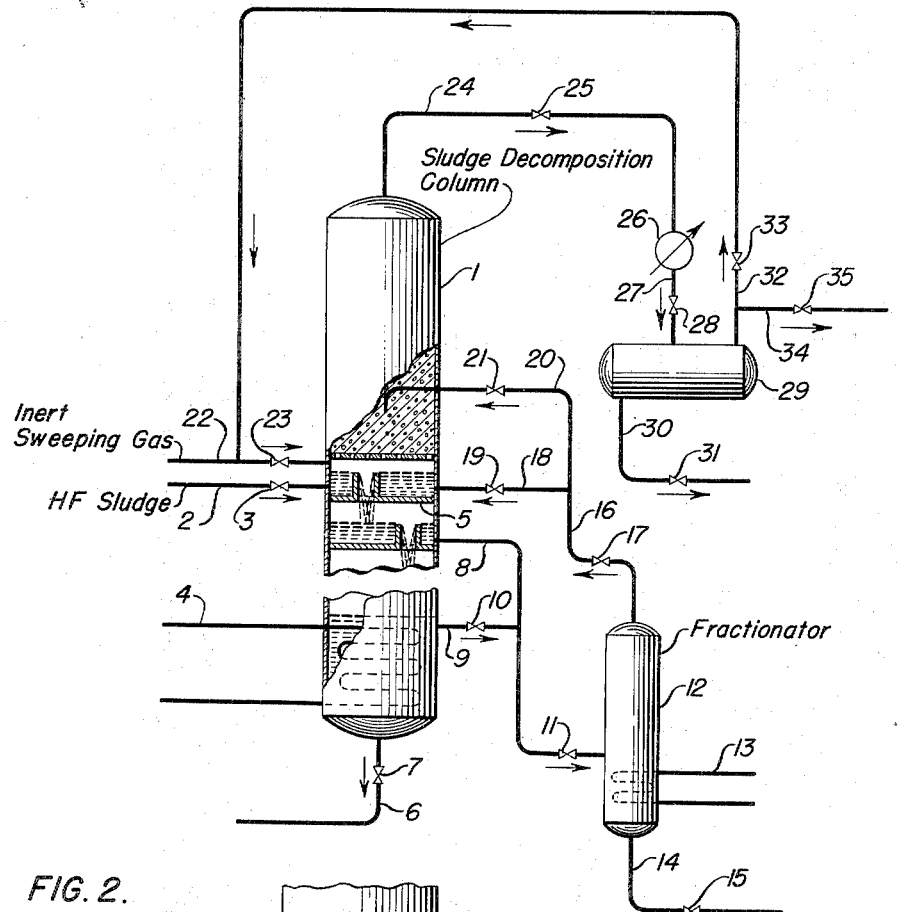

Jan. 16, 1951     A. E. HOFFMAN     2,538,001
PRODUCTION OF POLYOLEFINIC HYDROCARBONS
Filed April 29, 1947

INVENTOR.
Alfred E. Hoffman
BY
Maynard P. Venema
Attorney

Patented Jan. 16, 1951

2,538,001

UNITED STATES PATENT OFFICE 2,538,001

PRODUCTION OF POLYOLEFINIC HYDROCARBONS

Alfred E. Hoffman, Clarendon Hills, Ill., assignor to Universal Oil Products Company, Chicago, Ill., a corporation of Delaware Application April 29, 1947, Serial No. 744,744

5 Claims. (Cl. 260—666)

The present invention relates to a process for the production of a specific class of unsaturated hydrocarbons particularly useful for drying oil purposes and for the synthesis of a wide variety of commercially useful products such as resin intermediates, plastics, resins, etc. The invention in its more specific aspects relates to a process involving a conjunct polymerization reaction wherein a reagent capable of causing polymerization and hydrogen transfer reactions among olefinic hydrocarbons is utilized as a reacting component and the product thereof is treated in the manner hereinafter specified to recover from the conjunct polymerization product a mixture of polyolefinic, cyclic hydrocarbons containing conjugated as well as non-conjugated double bonds. More particularly, it concerns a specific method of recovering said polyolefinic cyclic hydrocarbons from the conjunct polymerization reaction product in high yields and in a condition in which said hydrocarbons have a high degree of conjugated unsaturation and improved drying oil properties.

It is the primary obect of this invention to provide an improved process for the manufacture of a hydrocarbon product containing polyolefinic hydrocarbons having conjugated and non-conjugated unsaturation, said product possessing superior qualities for use as a drying oil.

It is a further object of the invention to provide an improved process for preparing a hydrogen fluoride sludge in exceptionally high yields and to treat said sludge in the manner hereinafter described to recover a hydrocarbon product having an unexpectedly high degree of conjugated and non-conjugated unsaturation.

It is still another object of the invention to provide a simplified procedure for contacting substantially anhydrous hydrogen fluoride with a non-aromatic hydrocarbon to form a hydrogen fluoride-unsaturated cyclic hydrocarbon reaction product (herein called a "sludge") wherein the hydrocarbon portion of the product contains a high degree of conjugated unsaturation and thereafter recovering said hydrocarbon portion of said product in accordance with the method herein provided to retain the highly unsaturated character of said hydrocarbons for utilization as a drying oil and as an intermediate for the formation of valuable derivatives thereof.

In a broad aspect the present invention relates to a process for producing a mixture of cyclic unsaturated hydrocarbons containing conjugated and non-conjugated unsaturation by contacting a substantially non-aromatic hydrocarbon containing at least 3 carbon atoms per molecule or a mixture of said non-aromatic hydrocarbons with substantially anhydrous hydrogen fluoride, removing a lower layer from the reaction product, said lower layer containing a major proportion of the hydrogen fluoride originally charged into the reaction, charging the same into an inert liquid medium maintained at a temperature sufficient to decompose said reaction product and to vaporize hydrogen fluoride therefrom, and recovering said mixture of unsaturated hydrocarbons from said inert liquid medium.

One of the principal embodiments of the invention concerns a method of effecting the recovery of the polyolefinic cyclic hydrocarbon component of a hydrogen fluoride sludge which comprises introducing said sludge in controlled amounts into an inert paraffinic hydrocarbon maintained under refluxing conditions at a temperature of from about 50° to about 250° C. such that the hydrogen fluoride content in such sludge rapidly flashes overhead to leave a hydrocarbon residue substantially free of hydrogen fluoride comprising said inert paraffinic hydrocarbon and said polyolefinic cyclic hydrocarbons and thereafter separating the components of said residue by distillation to segregate said polyolefinic cyclic hydrocarbon.

In accordance with a more specific embodiment, the present invention comprises reacting an octene fraction of a non-selective polymer gasoline with substantially anhydrous hydrogen fluoride in a weight ratio of olefins to hydrogen fluoride of from about 1.5 to about 2.5 to thereby form a two-phase reaction product which separates on standing into an upper saturated hydrocarbon layer and a lower sludge layer containing a conjunct polymerization reaction product of said olefinic charge in chemical combination with said hydrogen fluoride as a loosely bound complex thereof, separating said layers, distilling said upper saturated hydrocarbon layer to separate therefrom a fraction boiling from about 50° to about 180° C., heating said fraction in a sludge decomposition reactor to a temperature of from about 150° to about 175° C. and thereafter supplying heat thereto as said lower sludge layer is continuously introduced into said fraction at a rate sufficient to maintain the temperature of said fraction at from about 150° to about 175° C., thereby vaporizing hydrogen fluoride from said sludge, continuously removing hydrogen fluoride vapors from said sludge decomposition reactor, withdrawing the hydrocarbon residue containing said saturated hydrocarbon fraction from said zone, vaporizing therefrom the saturated hydrocarbon fraction, recycling said latter fraction to said zone and recovering from the residue of the last mentioned vaporization, polyolefinic cyclic hydrocarbons containing conjugated as well as non-conjugated unsaturation.

Another specific embodiment of the present invention relates to a process for effecting vaporization of the hydrogen fluoride from the aforementioned hydrogen fluoride sludge by charging into the sludge decomposition reactor an inert sweeping gas during the decomposition of said sludge to thereby effect rapid removal of the hydrogen fluoride from said reactor and substantially eliminate the polymerization and deterioration of the polyolefinic cyclic hydrocarbon product of the sludge decomposition.

It has heretofore been recognized that the hydrocarbons which may be recovered by special methods from the sludges formed in a hydrogen fluoride alkylation process possess drying oil properties and are, in general, of a polycyclic nature containing varying degrees of unsaturation, depending upon the method employed for recovering said hydrocarbons from the sludge. It has also been realized that said hydrocarbons are of a highly unsaturated nature if recovered in their original state as they exist within the sludge. The methods presently known for recovering said sludge hydrocarbons, however, are not adapted to retain the highly unsaturated characteristics of these hydrocarbons or if such result is obtained, the quality of the hydrogen fluoride recovered is of such pronounced inferiority as to render the process impractical of operation. In contradistinction to these prior methods for recovering the unsaturated hydrocarbon portion of hydrogen fluoride sludges, the present process provides a means for economically recovering the sludge hydrocarbons in substantially their original highly unsaturated condition as they exist in the sludge while at the same time maintaining the quality of the hydrogen fluoride recovered, suitable for immediate recycling to the sludge-forming process. The hydrocarbons associated with the hydrogen fluoride in the form of complex addition compounds contained in the spent hydrogen fluoride phase or sludge may be recovered in a highly unsaturated state when due care is taken to prevent their polymerization and condensation into more highly saturated hydrocarbons, high boiling tars, and resinous products.

According to the operation of the present process as indicated in the prior specific embodiments, a non-aromatic hydrocarbon or a substantially non-aromatic mixture thereof capable of undergoing conjunct polymerization is contacted with certain optimum proportions of substantially anhydrous hydrogen fluoride at reaction conditions hereinafter specified to form a hydrogen fluoride sludge containing polycyclic hydrocarbons of which a large number contain conjugated and non-conjugated unsaturation, said hydrocarbons combining with the hydrogen fluoride catalyst in the form of a complex addition product or coordination compound during the conjunct polymerization reaction. The ultimate preparation of a desirable drying oil product depends in large measure upon the type of hydrocarbons employed in the sludge-forming or conjunct polymerization reaction. It has been found that the preferred charging stocks comprise, in general, olefinic hydrocarbons containing at least 4 carbon atoms per molecule, and are preferably olefins of branched chain structure, although cyclic and straight chain olefinic hydrocarbons as well as propylene may also be utilized in the sludge-forming reaction by modifying the reaction conditions somewhat. When utilized as charge to the sludge-forming reaction, propylene is desirably charged in admixture with higher molecular weight hydrocarbons, especially olefins and a larger proportion of hydrogen fluoride to hydrocarbons is utilized in the sludge-forming reaction. Generally speaking, hydrocarbon mixtures may be employed in the preparation of the sludge, the proportion of aromatic hydrocarbons in the mixture charged to the reaction desirably being small, since it has been observed that the latter class of hydrocarbons reduce the yield of sludge and are otherwise undesirable in the preparation of the sludge. Paraffinic hydrocarbons, either alone or in admixture with olefins in the charging stock, may also be utilized, especially when branched chain paraffins and/or naphthenes are charged and when slightly higher temperatures are provided for conversion into a sludge compared to the temperatures utilized for conversion of an olefinic charge. An especially preferred charging stock from the standpoint of general availability and desirability in yielding a highly unsaturated drying oil product is the octene fraction of a selective or non-selective polymer gasoline (prepared by the copolymerization of various butylenes and/or propylene) or the hexene fraction of a propylene polymer. Another suitable hydrocarbon charging stock of the hydrocarbon mixture type is the $C_6$ to $C_{12}$ fraction of a thermally cracked gasoline product low in aromatic content.

The hydrogen fluoride utilized as condensing agent in the sludge-forming reaction is preferably the substantially anhydrous reagent containing not less than about 95 to about 99+% hydrogen fluoride, although somewhat lower concentrations of hydrogen fluoride may also be utilized with correspondingly less economical results however. Provided suitable sludge-forming reaction conditions are maintained, generally characterized as higher reaction temperatures and/or a longer reaction period than the corresponding reaction conditions maintained for the anhydrous reagent, the hydrogen fluoride reagent may contain up to 10% water. The recycled hydrogen fluoride obtained by decomposition of the hydrogen fluoride sludge as hereinafter described may be employed when provisions are made in the operation of the process to recover the hydrogen fluoride in an anhydrous or nearly anhydrous condition.

On contacting the above described reactants at reaction conditions specified, generally, as "sludge-forming" or "conjunct polymerization" reaction conditions, the hydrogen fluoride in an initial phase of the reaction acts catalytically in effecting hydrogen transfer between the hydrocarbon reactants charged. As the initial reaction proceeds and an accumulation of unsaturated hydrocarbons occurs in the reaction mixture, the hydrogen fluoride acts further in catalytically promoting polymerization and cyclization of the unsaturated or hydrogen-poor components of the reaction mixture. The net result of the combined hydrogen transfer, polymerization and cyclization reactions (which, in effect occur substantially as a simultaneous combination reaction) is the production of large unsaturated hydrocarbon molecules having polycyclic and/or conjugated polyolefinic structures. The unsaturated hydrocarbons formed by the conjunct polymerization reaction combine with the hydrogen fluoride in certain definite combining ratios to form the sludge reaction product utilized as the intermediate starting material of this invention. As a result of the hydrogen transfer reaction, a portion of the hydrocarbon components of the reaction mixture become saturated to form an upper hydrocarbon layer of the reaction mixture which may be readily decanted from the lower sludge layer containing the present starting material. As referred to herein, the term "coordination complex" or "compound" designates the chemical compound consisting of hydrogen fluoride and the unsaturated hydrocarbons containing conjugated and non-conjugated unsaturation having a mono- and/or polycyclic structure formed by the conjunct polymerization of the hydrocarbon charge and contained in the lower layer "sludge" product.

The sludge-forming stage of the present process is effected by contacting a hydrocarbon charging stock of the aforementioned composition and type, preferably an olefinic hydrocarbon charging stock composed of olefins having at least 3 carbon atoms per molecule (preferably at least 4), with substantially anhydrous hydrogen fluoride in the temperature range of from about $-30°$ to about $200°$ C. (preferably from about $30°$ to about $125°$ C.) and at a superatmospheric pressure sufficient to maintain the reactants in substantially liquid phase. An optimum yield of sludge is obtained, which when treated as hereinafter set forth yields a drying oil product having a maximum degree of conjugated and non-conjugated unsaturation, when the weight ratio of olefins to hydrogen fluoride charged to the reaction is from about 1.5 and about 3.5 and especially from about 1.7 to about 2.5. When utilizing a hydrocarbon charge to the sludge-forming reaction which contains a large proportion of propylene, the weight ratio of olefins to hydrogen fluoride charged to the reaction is preferably maintained somewhat lower (from about 1.5 to about 2.0) than the corresponding ratio when olefins containing more than 4 carbon atoms per molecule are charged. At these reaction conditions and when the mixture of hydrocarbons and hydrogen fluoride is vigorously agitated by some form of stirring device, a sludge is formed almost immediately, although the reaction may be allowed to continue for one or more hours to obtain peak production of the sludge. The increment in yield however, becomes progressively smaller as reaction time proceeds such that the economy of operating at longer reaction periods than about ten minutes is seriously in doubt. The two liquid phases formed in the reaction separate upon standing into an upper layer comprising chiefly saturated hydrocarbons and a lower layer containing a major proportion of the hydrogen fluoride charged into the reactor in the form of the aforementioned complex addition product of the hydrogen fluoride and the unsaturated cyclic hydrocarbon product of the reaction. The latter sludge layer is a mobile fluid product which is separated from the upper layer hydrocarbons by simple decantation.

The upper hydrocarbon layer which comprises chiefly saturated hydrocarbons when the above optimum proportions of reactants are employed in the sludge-forming reaction is a valuable by-product of the herein described process. The gasoline boiling range portion of these hydrocarbons is generally of high octane number and of low bromine number, utilizable as a high-grade aviation fuel.

The unsaturated cyclic hydrocarbon product present in combination with the hydrogen fluoride as the sludge formed according to the heretofore described process, may be recovered from said sludge by any of the presently known methods developed by the prior art, including the aqueous hydrolysis method and the thermal decomposition process, the latter at atmospheric or sub or superatmospheric pressures. A comparison of the available methods for sludge decomposition and for recovery of the hydrocarbon component of said sludges has shown, however, that these methods yield a drying oil product having generally inferior properties and/or reduce the concentration of the hydrogen fluoride (desirably recovered in as high a concentration as possible for immediate recycling to the sludge-forming reaction) to a dilute aqueous acid or to an acid containing a large proportion of difficultly removed hydrocarbons.

In the accordance with the method herein provided as the preferred procedure for recovering the polyolefinic, cyclic hydrocarbon component of the sludge, while in the same operation maintaining the highly unsaturated character of the hydrocarbon product and a high concentration of the recovered hydrogen fluoride, the sludge is introduced at a controlled rate into an inert heated liquid, for example into a non-olefinic hydrocarbon (preferably naphthenic or paraffinic which are not highly branched) having a boiling range of from about $50°$ C. to about $180°$ C., and permitting the released hydrogen fluoride to rapidly escape from the reactor out of contact with the hydrocarbon product. One of the outstanding features of the present process which accounts for the improved quality of the hydrocarbon product for drying oil purposes, owing to the large number of conjugated double bonds present in the product, is the fact that the hydrocarbons released by the decomposition of the sludge are removed from the contact with free hydrogen fluoride immediately upon release of the latter component from the sludge. The presence of free hydrogen fluoride in contact with the polyolefinic, cyclic hydrocarbon product is believed to be the primary cause of the deterioration in the desirable qualities of the hydrocarbons because of the pronounced polymerizing ability of free hydrogen fluoride. It has been observed, for example, that the free hydrocarbons themselves, not in contact with a conjunct polymerization catalyst, are very stable and retain their structure, including their conjugated as well as non-conjugated unsaturation even at elevated temperatures, (that is, up to about $200°$ C.). Further, evidence is available to indicate that when the sludge hydrocarbons are completely bound to the conjunct polymerization catalyst in the form of a complex therewith, (forming a coordination type compound) the unsaturated hydrocarbons are likewise stable and show no tendency to undergo undesirable polymerization, the hydrocarbons retain their polyolefinic, cyclic structure, wherein the unsaturation is both conjugated and non-conjugated, while, and so long as, they are either completely combined with the hydrogen fluoride as a complex therewith or are substantially free of hydrogen fluoride. Any system, therefore, containing insufficient hydrogen fluoride to combine completely with all of the polyolefinic cyclic hydrocarbons, such as a sludge from which a portion of the hydrogen fluoride has been removed, is unstable insofar as the polyolefinic cyclic hydrocarbons are concerned, the latter polymerizing cyclicizing and isomerizing in the presence of the hydrogen fluoride to form products which have fewer conjugated unsaturated bonds. An analysis of typical hydrogen fluoride sludges has shown that each double bond of the polyolefinic sludge hydrocarbons is associated with 6 mols of hydrogen fluoride, such that any mixture of sludge hydrocarbons and hydrogen fluoride containing more of the latter component than will satisfy all the double bonds of the hydrocarbons present, will be completely stable due to the formation of the hydrogen fluoride-unsaturated hydrocarbon complex or stable coordination compound. On the other hand, any mixture of the above components wherein the amount of hydrogen fluoride therein is insufficient to form a complex with all of the hydrocarbons present will not be stable and the excess of hydrocarbons will undergo undesirable polymerization cyclization and isomeriation to form products having a greatly reduced number of unsaturated bonds, particularly of the conjugated type; in some instances the hydrocarbons polymerize to form high molecular weight resins and tars. The relationship may be shown diagrammatically by the following table I.

TABLE I

*Stability of polyolefinic cyclic hydrocarbons with respect to conjugated unsaturation in the presence of hydrogen fluoride*

|   | Stable: | Polyolefinic cyclic hydrocarbons containing no hydrogen fluoride; 100% hydrocarbons. |
|---|---|---|
| HF Present | Unstable compositions: | Free polyolefinic cyclic hydrocarbons in the presence of some hydrogen fluoride, but of insufficient amount to form a complex or sludge with all of the hydrocarbons; the hydrocarbons isomerize and lose their conjugated unsaturation. At high temperatures, tar formation takes place. |
|   | Stable: | Polyolefinic cyclic hydrocarbons in the presence of sufficient hydrogen fluoride to provide at least 6 mols of HF per unsaturated hydrocarbon bond are all in the combined "complex" or sludge state; completely stable; no polymerization, except at high temperatures. |

The present invention represents a method of decomposing hydrogen fluoride sludges to recover the polyolefinic hydrocarbons therefrom in their original highly unsaturated state and to obviate the formation of such mixtures of hydrogen fluoride and hydrocarbons as fall in the unstable region. The method basically involves a system of decomposition whereby the hydrogen fluoride vapors released upon decomposition of the sludge are rapidly removed from the reactor to prevent formation of such mixtures as lie in the unstable region, intermediate between the completely free stable hydrocarbons and the completely combined complexed hydrocarbons. The method herein provided involves introducing the sludge into a reactor containing an inert liquid which dissolves the polyolefinic cyclic sludge hydrocarbons immediately upon their release by decomposition of the sludge and further, maintaining the inert liquid at a temperature sufficiently high that the hydrogen fluoride also released by the decomposition is immediately vaporized and separated from the liquid phase in the reactor. The temperature of the inert liquid phase is, on the other hand, maintained below the boiling points of the polyolefinic cyclic hydrocarbons dissolved therein such that almost none of said hydrocarbons are allowed to mix with the hydrogen fluoride vapor to form mixtures thereof lying within the range of compositions wherein the hydrocarbons are unstable and form polymers.

One of the preferred embodiments of this invention concerns a sludge decomposition process involving the operation as above described but being further characterized in that an inert sweeping gas is introduced into the decomposition reactor to remove the hydrogen fluoride vapors from the decomposition reactor as rapidly as formed and thereby reduce to a minimum the undesirable contact of the hydrogen fluoride vapors and polyolefinic cyclic hydrocarbons dissolved in the inert liquid phase.

Suitable inert liquids into which the hydrogen fluoride sludge may be charged in accordance with the present invention are selected from compounds which remain liquid at the temperatures utilized for the present process and which do not react with hydrogen fluoride or the hydrogen fluoride sludge. The inert liquid medium may be a hydrocarbon such as a paraffin or a naphthene boiling from about 50° to about 180° C. Typical of the latter are such saturated hydrocarbons as octanes, nonanes, decanes, or a mixture of said hydrocarbons, such as a fraction of a straight run gasoline boiling in the above range, diethylcyclohexane, trimethylcyclohexane, etc. One of the preferred sources of the inert liquid utilized in the sludge decomposition column is a suitably boiling fraction of the upper layer, saturated hydrocarbon product of the sludge-forming reaction, such as a fraction boiling from about 50° to about 180° C. Other compounds utilizable include the haloalkanes, such as bromo- or chloroheptane, dibromo- or dichlorohexane, etc., and various inorganic compounds such as salts melting below the above desired temperature range of operation and which are stable to hydrogen fluoride. The preferred inert liquids of the above broadly indicated classes are the saturated paraffinic and/or cycloparaffinic hydrocarbons, because of their solubility with the released polyolefinic cyclic hydrocarbon product. As indicated, the inert liquid medium is maintained at a temperature of from about 50° to about 250° C., preferably from about 110° to about 140° C., as the sludge is charged into a pool of the inert liquid maintained within a decomposition column and heat is supplied not only for the purpose of supplying the latent heat of vaporizing the hydrogen fluoride from the sludge but also, for the heat required for decomposing the hydrogen fluoride-polyolefinic hydrocarbon coordination compounds comprising the sludge.

One procedure for effecting the sludge decomposition, generally the preferred method herein provided, is illustrated in the attached diagram, Figure 1, which, although illustrating one of the preferred arrangements of apparatus and flow for effecting the present process, is nevertheless merely typical of the various possible arrangements utilizable therefor. Sludge decomposition column 1 comprises a tubular type reactor containing in the upper section thereof a housing for vapor released by the decomposition of the hydrogen fluoride sludge and may contain fractionating means for separating the components of the vapor entering said section. The middle section of column 1 contains one or a plurality of liquid-retaining means in the form of liquid wells or trays having openings surrounded by weirs through which the excess liquid accumulating on said trays is allowed to flow to reach lower trays in the column or enter the bottom reboiling section of the column. The lowermost section of column 1 is a reboiler wherein the liquids separated in the upper sections of column 1 are heated to vaporize the more volatile components thereof and thereby provide a vapor stream necessary for the operation of the present process as hereinafter more fully described.

In accordance with the actual operation of the present sludge decomposition process, a hydrogen fluoride sludge, prepared for example by the deliberate sludging of an olefinic hydrocarbon containing at least 3 carbon atoms per molecule with substantially anhydrous hydrogen fluoride or a sludge derived as a by-product of a hydrocarbon conversion process wherein hydrogen fluoride is utilized as a catalyst and in which essentially non-aromatic hydrocarbons are charged, is introduced into sludge decomposition column 1 via line 2 containing valve 3 and is discharged into column 1, preferably on to the uppermost tray contained in the middle section of the column. Prior to the actual introduction of the sludge on to any tray in column 1, the inert liquid contained in said tray is brought into a state of thermal equilibrium by boiling the inert liquid medium in the reboiling section of the column. As heretofore indicated the inert liquid medium has a boiling point within the range of from about 50° to about 180° C. and is maintained in a constantly refluxing condition by heat supplied to the reboiling section by any suitable means of supplying heat thereto, as for example, by reboiler coil 4. Vapors of the inert liquid medium formed in the reboiling section are at least partially condensed in the upper fractionating section of column 1 and when the column is in thermal equilibrium, the uppermost tray in the middle section of the column (tray 5), is filled with a pool of the inert liquid medium and is maintained at or near the boiling point thereof by the latent heat content of the rising vapors which impinge on the bottom surface of tray 5 and rise through the opening contained in the tray into the upper fractionating section of column 1. The pool of inert liquid is continuously maintained on tray 5 by reboiling the inert liquid at a sufficient rate to permit at least a portion of the vapors to condense in the fractionating section of column 1 and flow downwardly into tray 5. The hydrogen fluoride sludge charged into the column is desirably introduced below the surface of the pool of liquid contained on tray 5, but if desired, the sludge may be introduced into the upper fractionating or vapor-containing section of column 1 or at any other point above the surface of the inert liquid medium retained on tray 5. According to the basic concept upon which the present process is believed to operate, the hydrogen fluoride sludge is immediately decomposed at the temperature of the liquid medium retained on tray 5. The latent heat of decomposition of the sludge and the cooling effect of the vaporization of the hydrogen fluoride from the sludge lowers the temperature of the liquid medium, but since heat is continuously supplied by the vapors produced in the reboiling section, the liquid on tray 5 is maintained at essentially the vapor temperature of the rising vapors impinging on the lower surface of the tray. Under equilibrium conditions, therefore, the liquid on tray 5 is maintained at approximately constant temperature, determined by the amount of reboiling in the lower section and the rate of charging the hydrogen fluoride sludge into column 1.

For optimum operation, the reboiling rate and sludge charging rate are adjusted so that the temperature of the inert liquid medium on tray 5 is held within the range of from about 50° to about 250° C., preferably at or near about 130° C., since at the latter temperature, decomposition of the sludge is obtained immediately and the quality of the recovered products is high.

Figure 2:
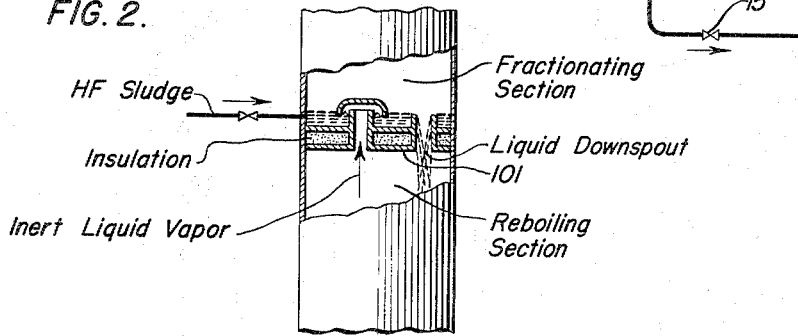

Figure 2 of the accompanying diagram illustrates an alternative, and generally preferred, type of tray utilizable in column 1 for effecting heat transfer into the hydrogen fluoride sludge and inert liquid medium retained thereon. The type of tray represented by tray 101 on Figure 2 is particularly preferred in the present process because of the greater utilization of heat supplied to the inert liquid medium in the reboiling section of column 1. In comparison with tray 5 of the heretofore given description of Figure 1, tray 5 represents a somewhat more simplified design and may be preferred for certain arrangements of apparatus, even though less economical of heat. For the sake of simplicity of illustration, tray 101 is represented as containing a single bubble cap and a single liquid overflow downspout; it is to be emphasized, however, that each tray may contain a plurality of said bubble caps and downspouts and column 1 may comprise a series of said trays similar to tray 5 below tray 101. Tray 101 is fabricated so as to be insulated on its under side to heat supplied by the vapors of inert liquid medium from the reboiling section below said trays. The heat insulating means on the bottom of the tray may be a simple vacuum or air space between the bottom wall of the tray and its false bottom wall. Alternatively, the space between the two walls may be packed with other insulating material such as asbestos fiber, glass wool, etc., the space being hermetically sealed to prevent the entrance of vapors therein. The bubble cap on the riser of tray 101 may be serrated as in the customary design of bubble caps to allow vapor to bubble into and through the liquid retained on the tray. The advantage of utilizing an insulated tray is apparent when it is realized that substantially all of the heat carried by the vapors of inert liquid medium from the reboiling section may be introduced directly into the sludge retained on tray 101 and, further, all of the vapors are condensed into the hydrogen fluoride sludge, thereby obtaining the advantages associated with dilution of the sludge hydrocarbons as decomposition takes place, the dilution in effect reducing the tendency of the liberated sludge hydrocarbons to polymerize and deteriorate. Indeed, it is desirable for most efficient recovery of sludge hydrocarbons in their most highly unsaturated condition (particularly, of the conjugated variety) to obtain as nearly as possible an infinite dilution of the hydrogen fluoride sludge hydrocarbons on tray 101. It is also characteristic of the arrangement represented by tray 101 that the rate of reboiling the inert liquid medium in column 1 may be adjusted so that none of the inert liquid medium vapors reach the fractionating section of column 1 and that substantially the entire heat of vaporization carried by the inert liquid vapors is utilized in decomposition of the hydrogen fluoride sludge charged on to tray 101, thereby effecting maximum utilization of heat supplied by the reboiling liquid medium.

The hydrogen fluoride released by the decomposition of the sludge is flashed into the upper fractionating section of column 1, wherein the hydrogen fluoride may be at least partially separated from any hydrocarbon vapors carried along with the hydrogen fluoride on decomposition.

The fractionating section of column 1 may simply be a hollow chamber for housing the vapors released by the decomposition, but is preferably either packed with a suitable packing material or contains bubble plates or other liquid-vapor retaining means to effect the desired fractionation. In accordance with one of the preferred embodiments of this invention, the fractionating section is packed with a sludge decomposition catalyst which thereby acts not only as a vapor-liquid contacting means but further provides a catalytic material which accelerates the decomposition of the hydrogen fluoride sludge. The catalysts utilizable as packing materials broadly comprise those substances which are solid at the operating temperatures within the fractionating section of the column and which are substantially inert to the continued action of free hydrogen fluoride. Suitable catalysts, in general, include certain metallic elements or alloys thereof, the metallic fluoride salts and oxy-fluoride salts of these metals and certain non-activated, generally graphitic forms of carbon. Of the metals utilizable as catalysts, copper, cobalt, cadmium, lead, nickel, tin, aluminum, chromium, zinc, iron, silver, magnesium, bismuth and tungsten have been found to possess catalytic properties and of these, the first 5 metals in the order named are generally preferred. Of the alloys, the preferred member of this group include the various brasses and bronzes containing copper, zinc and lead in various proportions. A brass alloy containing from about 50 to about 75% copper, from about 20 to about 40% zinc, and from about 0.25 to about 10% of lead or tin is a very effective catalyst for the decomposition of the sludge.

According to one alternate method of operating the process when a catalytic packing material is utilized, the sludge may be charged into the upper fractionating section of column 1 such that the sludge is allowed to flow over the catalytic packing material contained in said section. The polyolefinic hydrocarbons released by the catalytic decomposition of the sludge flow downwardly through the column, while the released hydrogen fluoride vapors ascend through the fractionating section and ultimately exit the column. It may also be desirable to charge the sludge into the upper fractionating section when a sludge decomposition catalyst is not utilized as packing material for the fractionating section. The latter type of operation provides for certain advantageous results obtained on contacting the sludge charge with hot vapors of inert liquid medium from the reboiling section of the column, the hot vapors condensing and carrying the dissolved liberated sludge hydrocarbons into the lower section of the column out of contact with additional sludge or hydrogen fluoride.

The polyolefinic cyclic hydrocarbon residue liberated by the decomposition of the hydrogen fluoride sludge, comprising the present product, in accordance with the above preferred method of operation, dissolves in the inert liquid medium on tray 5 and is thereby protected from contact with free hydrogen fluoride vapors above the liquid which would tend to polymerize and/or isomerize the unsaturated hydrocarbons and deteriorate their quality if allowed to remain in contact therewith. As additional sludge is continuously charged into column 1 on to tray 5, the excess flows over the weir on tray 5 and through the opening therein on to the next succeeding lower tray or into the bottom or reboiling section of column 1. When column 1 contains a plurality of trays in the middle section thereof, the opening on any single tray is situated so that it is not directly above or below the corresponding opening of a lower or upper tray, thus giving a staggered effect when a cross-sectional view of the column is taken, as in Figure 1. The lowest boiling components of the polyolefinic cyclic hydrocarbon product released by decomposition of the hydrogen fluoride sludge boil at about 180° C. so that the mixture of inert liquid medium and hydrocarbon product entering the reboiling section may be constantly refluxed to vaporize therefrom the inert liquid medium which ascends the column as a vapor through the staggered openings on the plates situated in the middle section of the column. If a sufficient number of plates are provided in the middle section, the inert liquid medium is continuously fractionated from the unsaturated hydrocarbon product so that only the latter unsaturated hydrocarbon product enters the reboiling section of the column. The liquid which gradually accumulates in the reboiling section is withdrawn therefrom through line 6 and valve 7 at a rate corresponding to the rate of charging the polyolefinic cyclic hydrocarbon component of the sludge into the column, thereby maintaining a constant liquid level in the reboiling section. When the liquid withdrawn through line 6 contains a mixture of product hydrocarbons and inert liquid medium (as, for example, when vaporization of the inert liquid medium in the reboiling section or upper trays in the column is not sufficiently rapid to continuously remove the inert liquid entirely from the mixture of hydrocarbons in the column) line 6 is provided to convey the mixture of hydrocarbons to a fractionator to separate the product and inert liquid medium, the latter being directly recycled to column 1 for further utilization therein. One means of effecting continuous fractionation of the inert liquid from the unsaturated hydrocarbon product is the alternative flow wherein the mixture of hydrocarbon product and inert liquid is withdrawn either from a plate in the middle section of the column through line 8 or from the liquid accumulation in the reboiling section through line 9 and valve 10, line 9 connecting with line 8 which conveys the liquid mixture through valve 11 into fractionator 12. Fractionation is effected in fractionator 12 by any convenient means; fractionator 12, for this purpose, may contain a packing material or a series of bubble plates for effecting fractional separation of the polyolefinic hydrocarbon product from the lower boiling inert liquid medium and a suitable means of heating, such as reboiler 13. The higher boiling polyolefinic hydrocarbon product is withdrawn from column 12 through line 14 containing valve 15 to storage or to other points of utilization while the lighter boiling fractions comprising the inert liquid medium are conveyed from fractionator 12 through line 16 containing valve 17 and may be directly recycled to column 1 by connection of line 16 with line 18 containing valve 19, said line 18 conveying the inert liquid medium directly on to the upper tray in the middle section of decomposition column 1. Alternatively, valve 19 may be closed and the liquid in line 16 may be directed into line 20 containing valve 21, said line 20 discharging the inert liquid medium into the upper vapor-containing fractionating section of column 1. Fractionator 12, if desired, may also be utilized to remove the constant boiling mixture of hydrogen fluoride and water which ordinarily accumulates in column 1 during operation of the process.

In accordance with one of the preferred methods of operating the present process, the sludge decomposition reaction is effected in the presence of an inert sweeping gas which is introduced into the sludge decomposition column 1 at a point below the fractionating section thereof, preferably above the upper tray (tray 5) therein. The inert sweeping gas referred to herein is a substance which remains gaseous under the temperature and pressure conditions at which the decomposition reaction is operated and which does not react in any manner with the sludge, hydrogen fluoride or unsaturated hydrocarbons present within the column during the decomposition of the sludge. In general, such substances include gases such as oxygen-free nitrogen, carbon dioxide and/or carbon monoxide and low molecular weight paraffinic hydrocarbons such as methane, ethane, propane, the butanes, etc. which have been thoroughly dried prior to their introduction into column 1. In some instances, the sweeping gas may be a substance which is liquid under normal conditions but which may be vaporized by heating; the resultant vapor is then utilized in its vapor state as the inert sweeping gas. The normally liquid substance is usually a paraffinic hydrocarbon boiling below about 150° C. and must necessarily be substantially insoluble in liquid hydrogen fluoride so that it may be subsequently separated therefrom and recycled in the process. The preferred sweeping gas is an inert low molecular weight paraffin and of these it is preferred to utilize those below hexane in molecular weight. The sweeping gas is desirably heated prior to being charged into the decomposition column to maintain the vapor-liquid equilibrium in the fractionating section. When utilized, the sweeping gas is introduced into column 1 through line 22, containing valve 23 at a point below the fractionating section where it joins with the released hydrogen fluoride vapors and carries the latter upwardly through the packing material or other fractionating means out of the top of the reactor through line 24 containing valve 25 and into condenser 26. Under normal conditions of operation, when equilibrium is established in column 1, the vapor fraction leaving column 1 through line 24 contains hydrogen fluoride vapors and the inert carrier gas introduced into column 1. Also, condenser 26 is operated at temperature and pressure conditions which cause the hydrogen fluoride component of the vapor stream to liquefy therein. Liquid hydrogen fluoride of 95 to 100% concentration (usually of 98 to 99% concentration by the present method of operation) is withdrawn from condenser 26 through line 27 containing valve 28 and is collected in receiver 29.

Under the usual operating conditions, whereby continuous sludge production is maintained to supply column 1, a major proportion of the liquefied hydrogen fluoride collecting in receiver 29 is recycled directly to the sludge-forming stage of the process. For this purpose the hydrogen fluoride may be withdrawn from receiver 29 through line 30 containing valve 31 and conveyed therefrom to the sludge-forming reactor directly, or if desired, to storage, neither of which are indicated on Figure 1.

The inert sweeping gas which does not liquefy with the hydrogen fluoride in condenser 26 when a normally gaseous sweeping gas is employed, is removed from receiver 29 and may be directly recycled to column 1 for continued utilization therein. The gas is thus removed from receiver 29 through line 32 containing valve 33 and may be directly connected with line 22 which conveys said sweeping gas into column 1. If desired, all or a portion of the sweeping gas may be diverted from line 32 through line 34 containing valve 35 for storage, purification or for other uses. When a normally liquid sweeping gas is employed in the process, the latter condenses with the hydrogen fluoride in condenser 26 and collects as an upper layer phase in receiver 29. In this case, the upper layer liquid is decanted from the liquefied hydrogen fluoride and recycled to charging line 22, either in the liquid form or as a vapor, formed, for example, by auxiliary heating means not shown on the diagram.

Sludge decomposition column 1 and/or other units of the apparatus may be operated at superatmospheric pressures up to about 30 atmospheres or at atmospheric or subatmospheric pressures, depending upon the temperatures desired in the individual units of the apparatus. It is generally preferred, however, to maintain all units of the apparatus under substantially the same pressure.

Representative unsaturated polyolefinic hydrocarbon fractions which I have prepared and analyzed usually have a wide boiling range of from about 180° to over 450° C., density of from about 0.83 to about 0.93, index of refraction of about 1.47 to about 1.53 (but usually 1.48 to 1.50), specific dispersion of about 125 to about 175 (but usually between 135 and 145), bromine numbers above about 140 (although they vary considerably with the average molecular weight), maleic anhydride values of about 30 to 90 (usually in the range of about 45 to 85), acid number below 3, average number of olefinic double bonds per molecule varying between about 2.5 and about 4, of which from about 40 to about 70 per cent are conjugated, and average molecular weight from about 200 to about 400, although the usual average is in the neighborhood of 300. Unsaturated hydrocarbon fractions derived from hydrogen fluoride sludges have also been prepared in which some of the hydrocarbons have molecular weights of as low as about 150 to as high as about 1000. Although hydrogen to carbon atomic ratios of the hydrocarbons contained in the unsaturated hydrocarbon fraction vary somewhat depending upon the particular source of the material, for a fraction derived from a polymer gasoline-hydrogen fluoride sludge they range from about 1.67 to about 1.72 (for the various fractions) with the actual weight percentage of hydrogen varying from about 12.35 to about 12.6.

The polyolefinic cyclic hydrocarbons containing conjugated and non-conjugated unsaturation recovered according to the present process have a special field of utility in the manufacture of drying oils, paints, varnishes, lacquers, shellac substitutes and other protective coatings and for this purpose they may be mixed with varying proportions of natural glyceride drying oils or utilized independently in the composition of said products. Besides being a particularly desirable drying oil, the product of the present process may be utilized in the preparation of resins and plastics and a variety of synthetic organic compounds. For example, the hydrocarbons may be condensed with dienophilic acid anhydrides such as maleic, itaconic and mesaconic acid anhydrides (or their derivatives) to form higher molecular weight acids or derivatives thereof. Such acids may be esterified or amidized to form resinous and plastic materials or other intermediates. The unsaturated properties of these hydrocarbons renders them suitable for halogenation to form halogen derivatives thereof from which insecticidal compositions may be prepared. Further, these hydrocarbons may be converted to derivatives of a variety of compounds for the preparation of detergents, siccatives, etc.

As a further modification of the process, the hydrogen fluoride-hydrocarbon sludge utilized as charging stock to the sludge decomposition reactor may be treated prior to decomposition with a solvent, such as a low-boiling saturated hydrocarbon, for example, pentane to extract therefrom saturated hydrocarbons entrained and/or dissolved in the sludge during the sludge-forming reaction.

The following example is introduced for the purpose of illustrating the results obtainable by the process of the present invention, but it should not be construed so as to limit the scope of the invention disclosed herein or claimed in the following claims.

EXAMPLE I

*Sludge-forming stage*

A hydrogen fluoride sludge was prepared according to the following procedure: The hydrocarbon charging stock was a codimer gasoline having a boiling range indicated by the following Engler distillation:

| Fraction: | Boiling point, ° C. |
|---|---|
| Initial | 45 |
| 10% over | 96 |
| 30% over | 113 |
| 50% over | 120 |
| 70% over | 140 |
| 90% over | 203 |
| End boiling point | 256 |

Two liters of the above codimer gasoline was gradually added under pressure and with stirring to 800 grams of anhydrous hydrogen fluoride. Stirring was continued for one hour at a temperature of from about 90° to about 95° C. followed by cooling the reactor and its contents to approximately 0° C. in an ice bath. The liquid products separated into two layers on standing, an upper hydrocarbon phase containing only a small amount of dissolved hydrogen fluoride which was removed and washed with a dilute solution of sodium hydroxide; and a lower sludge layer containing substantially all of the hydrogen fluoride charged to the reactor. The upper hydrocarbon layer after being washed with dilute sodium hydroxide and defluorinated by passing the same over alumina at 200° C. yielded a gasoline of 300° F. E. P. having a clear octane rating of 87.1 and a leaded octane rating (2 cc. of tetraethyl lead added per gallon of upper layer) of 99.1. The lower sludge layer formed in the sludge reactor was decanted therefrom and reserved for subsequent treatment as below. It contained approximately 64% of hydrogen fluoride (believed to be practically all in a combined state as a hydrogen fluoride-hydrocarbon addition complex) and 36% hydrocarbons.

*Sludge decomposition stage*

The hydrogen fluoride lower layer prepared as described above was charged into a decomposition tower containing copper metal packing and operated so that the bottom portion of the tower contains a pool of liquid hydrocarbons of 120–140° C. boiling range. The hydrogen fluoride lower layer and additional 120–140° C. paraffinic acid treated naphtha were charged directly into this pool at a ratio of 100 ml. of sludge per 200 ml. of naphtha. An external heater maintained a temperature of 125–130° C. in the pool. Sludge entering this pool decomposed into hydrogen fluoride vapor which passed upwardly from the pool into the free space in the tower and after cooling to 40–60° C. was removed from the decomposition tower through a vapor outlet leading into a condenser; a hydrocarbon phase (the product released by the decomposition of the sludge) dissolved in the paraffinic naphtha pool. Liquid was removed from the bottom of the tower so as to maintain a constant liquid level within the tower. The liquid was separated by distillation into a naphtha suitable for recycle and sludge hydrocarbons which have a 64 diene number. A sample of sludge hydrocarbons obtained by aqueous hydrolysis of the same lower layer complex has a 69 diene number. The decomposition of the sludge by the above method is virtually complete (less than 0.1% hydrogen fluoride remaining in the hydrocarbon phase and 99+% of the hydrogen fluoride originally present in the sludge being recovered in the acid receiver). The acid in the receiver which was connected to the condenser of the column analyzed 98% hydrogen fluoride.

EXAMPLE II

Utilizing the same apparatus and the charging stocks prepared as in Example I, above, the hydrogen fluoride sludge was introduced into the paraffinic naphtha pool maintained at 130–135° C. at a ratio of 100 ml. of sludge to 25 ml. of naphtha. The ultimate sludge hydrocarbons had a 55 diene number and a recovery of 99+% of the hydrogen fluoride having a concentration of 98.50% hydrogen fluoride was obtained.

EXAMPLE III

The sludge prepared as in Example I, above, was charged into the vapor space above the pool of paraffinic naphtha maintained at its boiling point. The sludge was charged at a rate sufficient to maintain its temperature at from 125 to 130° C. by naphtha vapors from the boiling pool. The sludge hydrocarbons recovered from the naphtha solution withdrawn from the naphtha pool in the decomposition column had a 58 diene number.

EXAMPLE IV

In an apparatus similar to that used in Example I to effect decomposition of the hydrogen fluoride sludge, except that the copper decomposition catalyst was omitted from the decomposition column, the sludge prepared as in Example I was charged into a paraffinic naphtha having a boiling range of from about 155° to about 175° C. derived as a fraction from the upper layer saturated hydrocarbons formed in the sludge-forming reaction. The sludge was charged at a rate of 200 ml. of naphtha per 100 ml. of sludge, the naphtha pool being maintained at a temperature of 160–165° C. The solution of naphtha and sludge hydrocarbons deposited therein on decomposition of the sludge was continuously removed from the naphtha pool to a fractionator where the naphtha was distilled from the residue comprising polyolefinic cyclic hydrocarbons and continuously recycled to the naphtha pool in the decomposition column. The recovered hydrocarbon product had a diene number of 65 and contained less than 0.01% fluorine as fluorides or otherwise. 99.9% of the hydrogen fluoride having a concentration of 98% hydrogen fluoride was condensed from the vapor stream from the decomposition column.

I claim as my invention:

1. A process for recovering the components of a complex of hydrogen fluoride with polyolefinic cyclic hydrocarbons containing conjugated and non-conjugated unsaturation, which comprises introducing said complex into a pool of inert liquid maintained at a temperature of from about 50° C. to about 250° C., thermally decomposing the complex by the heat of said inert liquid to release hydrogen fluoride vapors from the polyolefinic cyclic hydrocarbons, rapidly removing the hydrogen fluoride vapors from contact with the resultant mixture of said inert liquid and polyolefinic cyclic hydrocarbons, and distilling said mixture to separate the polyolefinic cyclic hydrocarbons from the inert liquid.

2. A process for recovering the components of a complex of hydrogen fluoride with polyolefinic cyclic hydrocarbons containing conjugated and non-conjugated unsaturation, which comprises introducing said complex into a pool of inert liquid in which said polyolefinic cyclic hydrocarbons are soluble, maintaining said inert liquid at a temperature of from about 50° C. to about 250° C., thermally decomposing the complex by the heat of said inert liquid to release hydrogen fluoride vapors therefrom and to dissolve the polyolefinic cyclic hydrocarbons in the inert liquid, rapidly removing the hydrogen fluoride vapors from contact with the resultant solution of said hydrocarbons in the inert liquid, and distilling said solution to separate the polyolefinic cyclic hydrocarbons from the inert liquid.

3. The process of claim 2 further characterized in that said inert liquid is a paraffinic hydrocarbon fraction boiling in the range of from about 50° C. to about 180° C.

4. The process of claim 1 further characterized in that said inert liquid consists essentially of at least one saturated hydrocarbon.

5. The process of claim 2 further characterized in that said inert liquid is a straight-run gasoline fraction.

ALFRED E. HOFFMAN.

REFERENCES CITED

The following references are of record in the file of this patent:

UNITED STATES PATENTS

| Number | Name | Date |
| --- | --- | --- |
| 1,099,530 | Wolff | June 9, 1914 |
| 2,400,520 | Kuhn | May 21, 1914 |
| 2,400,521 | Kuhn | May 21, 1946 |
| 2,408,173 | Matuszak | Sept. 24, 1946 |
| 2,413,310 | Bloch | Dec. 31, 1946 |
| 2,436,695 | Kuhn | Feb. 24, 1948 |
| 2,440,454 | Vinyard | Apr. 27, 1948 |
| 2,440,459 | Bloch | Apr. 27, 1948 |
| 2,440,477 | Johnstone | Apr. 27, 1948 |
| 2,481,498 | Carnell | Sept. 13, 1949 |